(12) United States Patent
Richter et al.

(10) Patent No.: US 8,604,924 B2
(45) Date of Patent: Dec. 10, 2013

(54) WIRELESS TRACKING AND MONITORING SYSTEM

(75) Inventors: Lutz P. Richter, Mixdorf (DE); Bernd Preusser, Frankfurt (DE); Uwe Hoke, Blankenfelde (DE)

(73) Assignee: Peiker Acustic GmbH & Co., Friedrichsdorf (DE)

( * ) Notice: Subject to any disclaimer, the term of this patent is extended or adjusted under 35 U.S.C. 154(b) by 983 days.

(21) Appl. No.: 12/698,219

(22) Filed: Feb. 2, 2010

(65) Prior Publication Data

US 2010/0188209 A1 Jul. 29, 2010

Related U.S. Application Data

(63) Continuation of application No. PCT/DE2008/001218, filed on Jul. 28, 2008.

(30) Foreign Application Priority Data

Aug. 7, 2007 (DE) .......................... 10 2007 037 180

(51) Int. Cl.
*G08B 1/08* (2006.01)

(52) U.S. Cl.
USPC .................................................. 340/539.13

(58) Field of Classification Search
USPC ................. 340/539.13, 13.24, 539.11, 539.1; 455/456.1, 522
See application file for complete search history.

(56) References Cited

U.S. PATENT DOCUMENTS

| 5,804,810 A * | 9/1998 | Woolley et al. ................ 235/492 |
| 8,154,397 B2 * | 4/2012 | Astrin ........................... 340/505 |
| 2005/0083172 A1 * | 4/2005 | Bates ........................... 340/5.21 |
| 2005/0170859 A1 * | 8/2005 | Koike et al. ................ 455/550.1 |
| 2007/0030116 A1 | 2/2007 | Feher |
| 2009/0054077 A1 * | 2/2009 | Gauthier et al. ........... 455/456.1 |

FOREIGN PATENT DOCUMENTS

| WO | 03/023326 A1 | 3/2003 |
| WO | 2006/119123 A2 | 11/2006 |

* cited by examiner

*Primary Examiner* — Phung Nguyen
(74) *Attorney, Agent, or Firm* — Burr & Brown

(57) ABSTRACT

The invention relates to a wireless tracking and monitoring system having at least one mobile unit and at least one central unit, wherein each mobile unit has at least one first communication component for communication with the central unit, wherein each mobile unit has at least one sensor, and wherein position finding can be carried out via a position finding system by at least one of the sensors. In this case, each mobile unit has a second communication component for communication with the central unit or with a target unit, and wherein the first and the second communication components of the mobile unit can be operated at the same time.

12 Claims, 2 Drawing Sheets

WIRELESS TRACKING AND MONITORING SYSTEM

CROSS REFERENCE TO RELATED APPLICATIONS

This application is a continuation of International Application No. PCT/DE2008/001218 filed Jul. 28, 2008, which designated the United States, and claims the benefit under 35 USC §119(a)-(d) of German Application No. 10 2007 037 180.4 filed Aug. 7, 2007, the entireties of which are incorporated herein by reference.

FIELD OF THE INVENTION

The invention relates to a wireless tracking and monitoring system.

BACKGROUND OF THE INVENTION

WO 2003/023326 A1 discloses a wireless tracking and monitoring system having at least one mobile unit and at least one central unit, wherein each mobile unit has a communication component for communication with the central unit, wherein each mobile unit has a sensor, and wherein position finding can be carried out via a position finding system by at least the sensors.

SUMMARY OF THE INVENTION

The invention is based on the object of developing a wireless tracking and monitoring system, which allows quick, error-free and manipulation-proof location of mobile units and data communication with mobile units.

The wireless tracking and monitoring system according to the invention has at least one mobile unit which has a second communication component for communication with the central unit or with a target unit, wherein the first and the second communication components can be operated at the same time. This makes it possible to initiate a data transmission and/or data reception of the first communication component in each case via the second communication component, or to receive or transmit data in parallel with a communication that is taking place, on a further radio path. Data transfers or data requests can therefore be handled without any time delay via the second communication component, independently of any data transmission which is taking place via the first communication component. A data transfer via the second communication component takes place, for example, for configuration and/or for transmission of initial data for fast position finding, wherein the data is transmitted on an encrypted transmission path, which cannot be manipulated. Forced position transmission from the mobile unit to the central unit takes place at selected target units, wherein the position transmission is initiated by means of the second encrypted transmission, which cannot be manipulated and is independent of the transmission component for monitoring and tracking the moving mobile unit. The use of two communication components makes it possible to ensure that the mobile unit can be actuated at all times, since the data transmission to the central unit takes place exclusively via the first communication component. This leads to short reaction times and to the capability to track the mobile unit with minimal delay.

Transmission of exact position data to the mobile unit via the second communication component, always allows better position finding, by means of which the current satellite data can also be monitored.

The invention also provides for a key to be transmitted via the second communication component, by means of which data which has been transmitted or received via the first communication component can be encrypted or decrypted. This allows the security to be enhanced further, since no key for future actions, and which can be used for manipulation, need be stored in the mobile unit.

The invention also provides for a key to be transmitted via one of the communication components, in order to initiate a secure action on the transmission path of the other communication component. This likewise makes it considerably more difficult to manipulate the mobile unit.

Finally, the invention provides communication with the second communication component, which takes place via a short-range radio link. This results in particular manipulation security since the mobile unit can be manipulated only if this can be done from within a short distance of the mobile unit.

BRIEF DESCRIPTION OF THE DRAWINGS

Further details of the invention will be described with reference to exemplary embodiments which are illustrated schematically in the drawings.

DETAILED DESCRIPTION OF THE INVENTION

Figure 1:
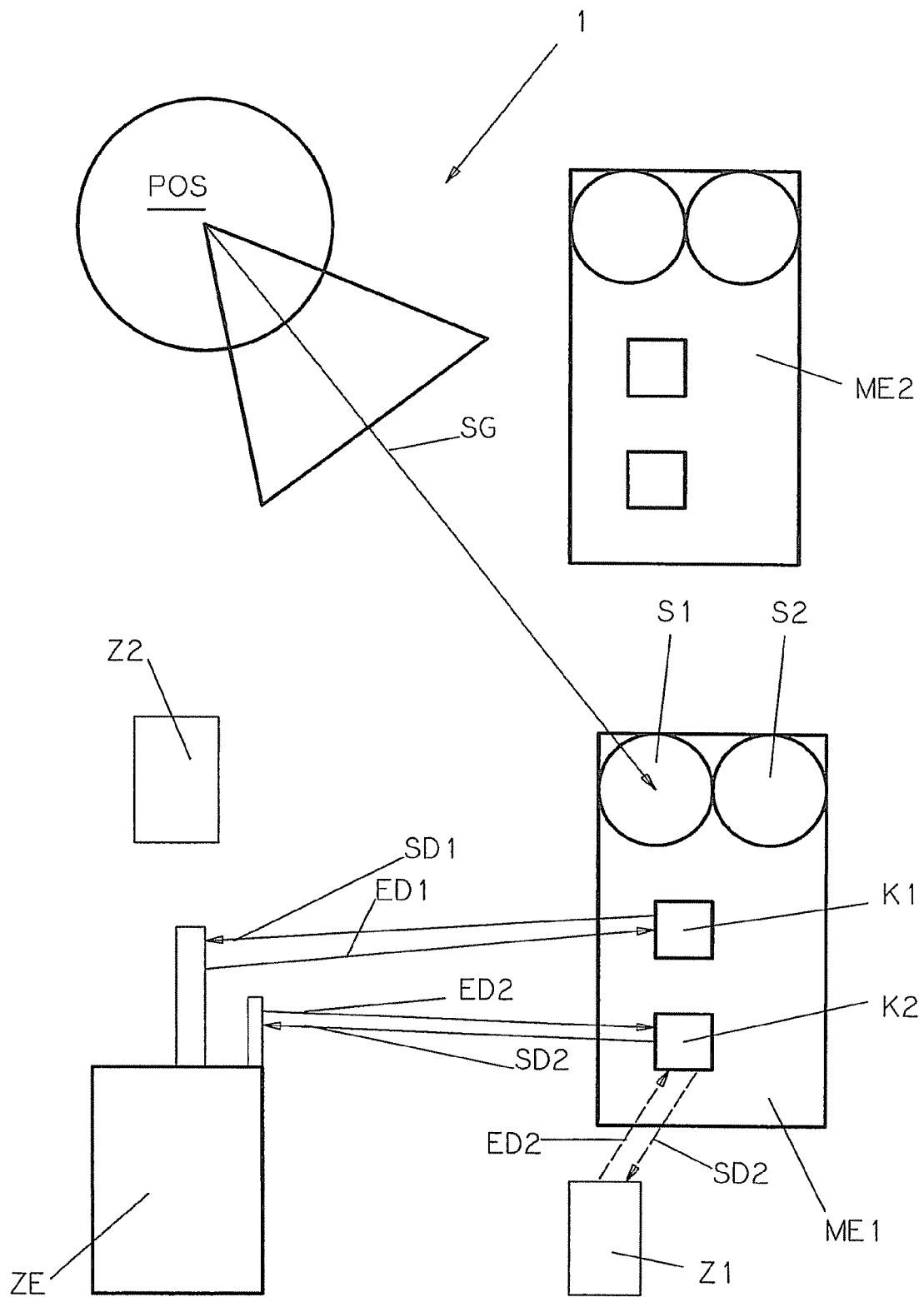
FIG. 1 shows a schematic illustration of a wireless tracking and monitoring system.
Figure 2:
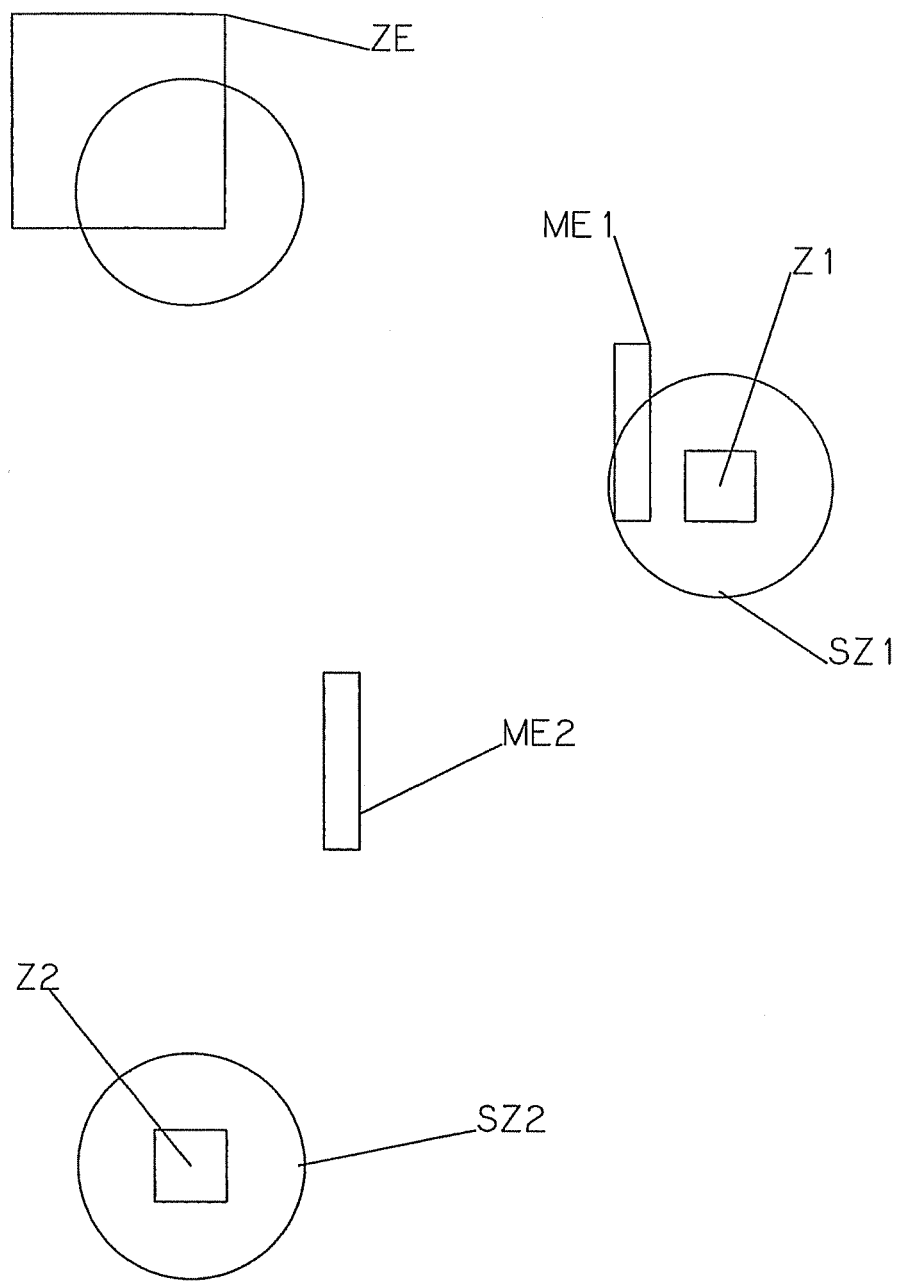
FIG. 2 shows a plan view, in the form of a further schematic illustration, of the wireless tracking and monitoring system.

FIG. 1 schematically illustrates a wireless tracking and monitoring system 1. The wireless tracking and monitoring system 1 has a central unit ZE, two target units Z1 and Z2, two mobile units ME1 and ME2, and a position finding system POS. The central unit ZE and the target units Z1 and Z2 are positioned physically separated from one another. The mobile units ME1 and ME2 can move freely and, for example, are linked to a person or a vehicle. The mobile unit ME1 has two communication components K1 and K2 and two sensors S1 and S2. The sensor S1 is in the form of a so-called GPS receiver, and is used to receive satellite signals SG from the position finding system POS, which is in the form of the so-called GPS system. By way of example, the second sensor S2 can be used to detect the ambient temperature. Data can be interchanged via the communication components K1 and K2, with there being a bidirectional radio link between the communication component K1 and the central unit ZE. The communication component K2 of the mobile unit ME1 is likewise linked for communication purposes to the central unit ZE in FIG. 1. The dashed-line arrows indicate that a communication link to the target unit Z1 is also possible, depending on the location of the mobile unit ME1. Whether the communication component K2 can communicate, and with which, unit ZE, Z1 and Z2 is dependent on its current position, since the communication component K2 for short-range radio links is, for example, in the form of an infrared radio link and/or a Bluetooth radio link. From the point of view of the communication component K1, transmission data SD1 is transmitted to the central unit ZE, and received data ED1 is received from the central unit ZE. From the point of view of the communication component K2, transmission data SD2 is transmitted to the central unit ZE or to one of the target units Z1 and Z2, and received data ED2 is received from the central unit ZE or from one of the target units Z1 or Z2. Initial data for fast position finding by means of the position finding system POS is configured and/or transmitted by the central unit ZE or by one of the target units Z1 or Z2 to the communication component K2. If the mobile unit ME1 can be moved in transmission areas SZ1 and SZ2, respectively, of the target units Z1 and Z2 (see FIG. 2), received data ED2 can be transmitted to the communication component K2, for example causing the mobile unit ME1 to transmit data relating to the route that has been traveled on as transmission data SD1 to the central unit ZE. In order to protect the transmission, the invention provides, for example, for the target unit Z1 to also transmit a key for encryption to mobile unit ME1 for the transmission data SD1 to the central unit ZE. The second mobile unit ME2 is equipped in a corresponding manner to the first mobile unit ME1.

The invention is not restricted to the illustrated or described exemplary embodiments. In fact, it covers developments of the invention within the scope of the patent claims. In particular, it is envisaged that the wireless tracking and monitoring system will be used for tracking and monitoring the people working on a factory site.

LIST OF REFERENCE SYMBOLS

1 Wireless tracking and monitoring system
ED1 Received data of (K1)
ED2 Received data of (K2)
K1 First communication component
K2 Second communication component
ME1 Mobile unit
POS Position finding system
SD1 Transmission data of (K1)
SD2 Transmission data of (K2)
SG Satellite signal
SZ1 Transmission area of Z1
SZ2 Transmission area of Z2
S1, S2 Sensor
ZE Central unit

We claim:

1. A wireless tracking and monitoring system comprising: at least one mobile unit and at least one central unit, wherein each mobile unit has at least one first communication component for communication with the central unit, wherein each mobile unit has at least one sensor, wherein position finding is carried out via a position finding system by at least one of the sensors, wherein each mobile unit has a second communication component for communication with the central unit or with a target unit, and wherein the first and the second communication components of the mobile unit are operated at the same time.

2. The wireless tracking and monitoring system as claimed in claim 1, wherein transmission of predefined transmission data by one of the two communication components is initiated by the reception of predefined received data by the other of the communication components.

3. The wireless tracking and monitoring system as claimed in claim 1, wherein data received by one of the communication components is used to initialize a software process whose results are transmitted by the other of the two communication components.

4. The wireless tracking and monitoring system as claimed in claim 1, wherein different frequencies are used for communication by the two communication components.

5. The wireless tracking and monitoring system as claimed in claim 1, wherein different radio standards are used for communication by the two communication components.

6. The wireless tracking and monitoring system as claimed in claim 1, wherein different transmission powers are used for communication by the two communication components.

7. The wireless tracking and monitoring system as claimed in claim 1, wherein the software in the mobile unit is configured via the second communication component.

8. The wireless tracking and monitoring system as claimed in claim 1, wherein initial data is transmitted via the second communication component in order to find the position of the mobile unit quickly.

9. A wireless tracking and monitoring system comprising: at least one mobile unit and at least one central unit, wherein each mobile unit has at least one first communication component for communication with the central unit, wherein each mobile unit has at least one sensor, wherein position finding is carried out via a position finding system by at least one of the sensors, wherein each mobile unit has a second communication component for communication with the central unit or with a target unit, wherein the first and the second communication components of the mobile unit are operated at the same time, and wherein transmission data of one of the communication components is encrypted with received data of the other of the two communication components.

10. A wireless tracking and monitoring system comprising: at least one mobile unit and at least one central unit, wherein each mobile unit has at least one first communication component for communication with the central unit, wherein each mobile unit has at least one sensor, wherein position finding is carried out via a position finding system by at least one of the sensors, wherein each mobile unit has a second communication component for communication with the central unit or with a target unit, wherein the first and the second communication components of the mobile unit are operated at the same time, and wherein received data of one of the communication components is decrypted with the received data of the other of the two communication components.

11. A wireless tracking and monitoring system comprising: at least one mobile unit and at least one central unit, wherein each mobile unit has at least one first communication component for communication with the central unit, wherein each mobile unit has at least one sensor, wherein position finding is carried out via a position finding system by at least one of the sensors, wherein each mobile unit has a second communication component for communication with the central unit or with a target unit, wherein the first and the second communication components of the mobile unit are operated at the same time, and wherein transmission of position data from the mobile unit via the second communication component to the central unit is forced to use the first communication component.

12. The wireless tracking and monitoring system as claimed in claim 11, wherein a short-range radio link is used for communication with the second communication component.

* * * * *